Figure 2:
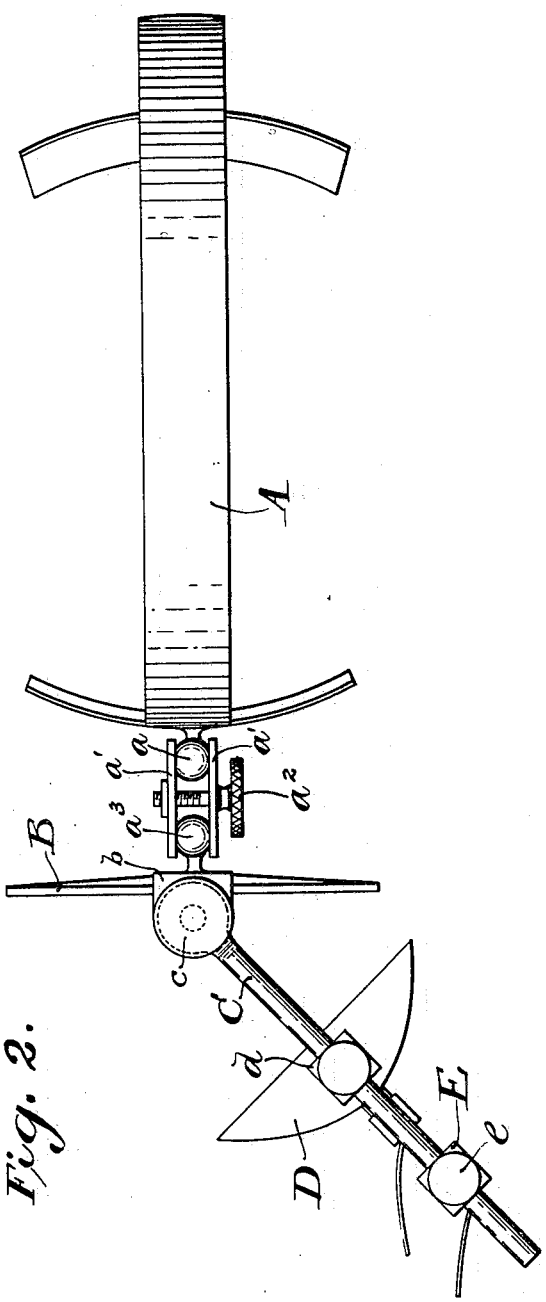

No. 769,420. PATENTED SEPT. 6, 1904.
A. F. WATCH.
ILLUMINANT ATTACHMENT FOR HEAD MIRRORS AND LARYNGOSCOPES.
APPLICATION FILED FEB. 17, 1904.
NO MODEL. 2 SHEETS—SHEET 1.
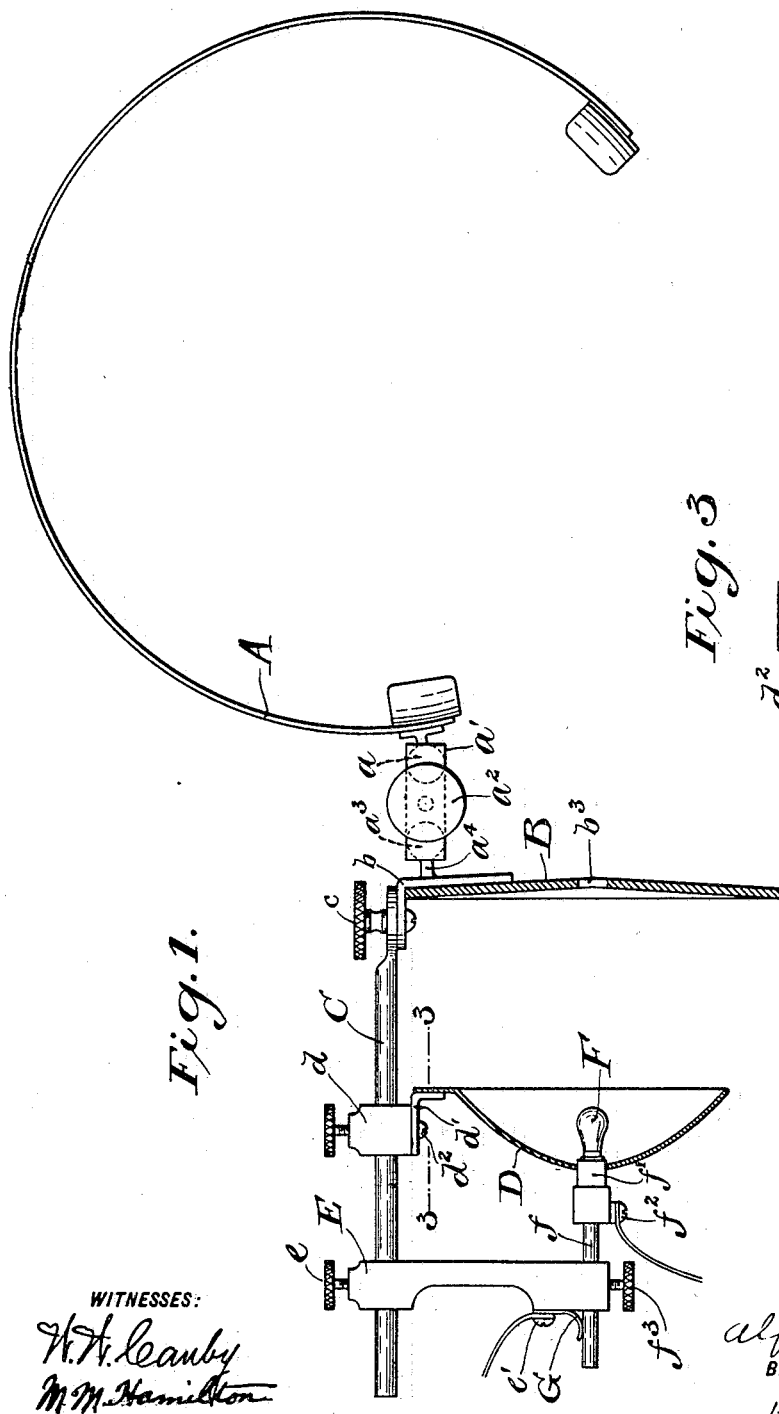
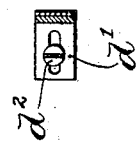
WITNESSES:
W. H. Canby
M. M. Hamilton
INVENTOR
Alfred F. Watch
BY
Hardwig & Hardin
ATTORNEYS No. 769,420. PATENTED SEPT. 6, 1904.
A. F. WATCH.
ILLUMINANT ATTACHMENT FOR HEAD MIRRORS AND LARYNGOSCOPES.
APPLICATION FILED FEB. 17, 1904.
NO MODEL. 2 SHEETS—SHEET 2.

WITNESSES:

INVENTOR

BY

ATTORNEYS

No. 769,420.

Patented September 6, 1904.

UNITED STATES PATENT OFFICE.

ALFRED F. WATCH, OF PHILADELPHIA, PENNSYLVANIA.

ILLUMINANT ATTACHMENT FOR HEAD-MIRRORS AND LARYNGOSCOPES.

SPECIFICATION forming part of Letters Patent No. 769,420, dated September 6, 1904.

Application filed February 17, 1904. Serial No. 193,969. (No model.)

*To all whom it may concern:*

Be it known that I, ALFRED F. WATCH, a citizen of the United States, residing at Philadelphia, county of Philadelphia, and State of Pennsylvania, have invented a new and useful Improvement in Illuminant Attachments for Head-Mirrors and Laryngoscopes, of which the following is a full, clear, and exact description, reference being had to the accompanying drawings, which form a part of this specification.

The illumination for reflectors or head-mirrors has heretofore been derived from lamps or other sources of illumination apart and separated from the head mirrors or reflectors. This has been inconvenient in that the reflected illumination has been in the line of vision at only one relative position of head-mirror and the source of light, necessitating a shifting or adjustment of one or both when the head and eyes of the operator are turned toward another part of the subject operated upon, some improvements to overcome these inconveniences by condensing-lenses having been attempted with small success.

The object of my invention relates to certain improved illuminant attachments for head mirrors or reflectors, so that the light-rays are retained in the line of vision in whatever direction the head of the operator be turned.

I will first describe the embodiment of my invention illustrated in the accompanying drawings and then point out the invention in the claims.

In the drawings, Figure 1 is a side view of my invention with the mirror and reflector in section. Fig. 2 is a plan view with the reflector turned to the operative position. Fig. 3 is a detail section on the line 3 3, Fig. 1.

A is the head-band, of well-known construction. This head-band is connected to the ball $a$, secured between frames $a'$, operated and supported by the clamping-screw $a^2$.

$a^3$ is a ball secured by projection $a^4$ to the angular frame $b$, to which is connected the head-mirror B, having the aperture $b^3$.

Swiveled on the frame $b$ and adapted to be secured thereto by the thumb-screw $c$ is the rod C. Mounted upon this rod, so as to be movable longitudinally and rotating thereon, is the frame $d$, to which, by means of the angle-frame $d'$, is secured the reflector D, the frame $d'$ being secured to frame $d$ by means of the screw $d^2$, upon which it is adapted to swivel. The reflector D may be parabolic, spherical, hyperbolic, or plane, as the purpose may require.

E is a frame secured to the rod C so as to be movable longitudinally and rotating thereon and is secured thereto by means of the thumb-screw $e$.

$f$ is a rod passing through the lower end of frame E and carrying the electric-light socket $f'$ and binding-post $f^2$ and light-bulb F, projecting through an opening in the reflector. This rod $f$ is secured to the frame E by the thumb-screw $f^3$.

G is a flexible strip of conductive material connected to and insulated from and having the binding-post $e'$. One wire from a source of current-supply (not shown) is connected to binding-post $f^2$, and the other wire from said source of current-supply is connected to the binding-post $e'$.

When the instrument is in use, the rod C is turned into the required angle to the plane of the mirror, as shown in Fig. 2, so that the reflector D is out of line of vision through the aperture $b^3$ to the subject. The point of light when parallel rays are desired is placed in the focus of the parabolic reflector, whence they are reflected to the surface of the head-mirror B, which may be plane or of such curvature as to focus the reflected rays at any desired point even though the point of light be inside of the focal distance of a concave mirror, the rod C being, after proper adjustment, securely clamped to the frame $b$, which being rigidly or fixedly connected to the mirror B maintains the relative position of the reflector-light and mirror to each other in whatever position they may be turned by the head of the operator acting on the head-bar A, upon which the whole apparatus is carried.

The reflector when properly constructed and adjusted screens the eye of the operator as well as the subject from direct illumination. The reflector and lamp-support are capable of adjustment along and with reference to the rod by the construction hereinbefore described.

I do not intend to limit myself to the details of construction hereinbefore set out except as the same may be specifically claimed, as these details may be varied from in many ways in an embodiment of my invention. I believe myself to be the first to have constructed a self-contained apparatus comprising an apertured mirror, a reflector, and illuminant so arranged as to maintain a constant relative position of the mirror, reflector, and illuminant with the line of vision through the aperture in the mirror unimpeded in any position the operator through the head-band may turn the apparatus.

Having now fully described my invention, what I claim, and desire to protect by Letters Patent, is—

1. In an apparatus of the character described, in combination, an apertured mirror, a reflector, an illuminating device, and a device connected to said mirror, adapted to be swung at an angle to said mirror, supporting said reflector and illuminating device.

2. In an apparatus of the character described, in combination, an apertured mirror, a reflector, a device connected to said mirror adapted to be swung at an angle to said mirror, supporting said reflector.

3. In an apparatus of the character described, in combination, an apertured mirror, a rod secured to said mirror so as to have an angular movement in relation thereto, and a reflector secured to said rod.

4. In an apparatus of the character described, in combination, an apertured mirror, a rod secured to said mirror so as to have an angular movement in relation thereto, an illuminating device, and a reflector secured to said rod.

5. In an apparatus of the character described, in combination, an apertured mirror, a rod secured to said mirror so as to have an angular movement in relation thereto, a frame mounted on said rod so as to have a rotary movement thereon and a reflector secured to said frame.

6. In an apparatus of the character described, in combination, an apertured mirror, a rod secured to said mirror so as to have an angular movement in relation thereto, a frame mounted on said rod so as to have a longitudinal and rotary movement thereon and a reflector secured to said frame.

7. In an apparatus of the character described, in combination, an apertured mirror, a rod secured to said mirror so as to have an angular movement in relation thereto, a frame mounted on said rod so as to have a rotary movement thereon and a reflector secured to said frame so as to have a movement thereon.

8. In an apparatus of the character described, in combination, an apertured mirror, a rod secured to said mirror so as to have an angular movement in relation thereto, a frame mounted on said rod so as to have a longitudinal and rotary movement thereon and a reflector secured to said frame so as to have a movement thereon.

9. In an apparatus of the character described, in combination, an apertured mirror, a rod secured to said mirror so as to have an angular movement in relation thereto, a frame mounted on said rod so as to have a rotary movement thereon and a reflector secured to said frame, a second frame mounted on said rod so as to have a rotary movement, and an illuminating device carried by said frame.

10. In an apparatus of the character described, in combination, an apertured mirror, a rod secured to said mirror so as to have an angular movement in relation thereto, a frame mounted on said rod so as to have a rotary movement thereon and a reflector secured to said frame, a second frame, carried by said rod so as to have a rotary movement thereon, and an illuminating device carried by said frame, there being an orifice in said reflector through which said illuminating device projects.

11. In an apparatus of the character described, in combination, a head-band, a frame, connection between said band and frame, allowing free movement of the head-band, an orificed mirror fixedly secured to said frame, a rod secured to said frame so as to be adapted to swivel thereon and a reflector carried by said rod.

12. In an apparatus of the character described, in combination, a head-band, a frame, connection between said band and frame, allowing free movement of the head-band, an orificed mirror fixedly secured to said frame, a rod secured to said frame so as to be adapted to swivel thereon and a reflector and an illuminating device carried by said rod.

13. In an apparatus of the character described, in combination, an orificed mirror, a reflector and an illuminating device, a device carried by the mirror, to which said reflector and illuminating device are secured, said reflector and illuminating device being adapted to have an angular movement with reference to the mirror.

14. In an apparatus of the character described, in combination, an orificed mirror and a reflector, and means whereby said reflector is secured to and carried by said mirror at an angle to said mirror.

15. In an apparatus of the character described, in combination, an orificed mirror, a reflector and its illuminant, and means whereby said reflector and illuminant are secured to and carried by said mirror at an angle to said mirror.

16. In an apparatus of the character described, an orificed mirror, a reflector, and means whereby said reflector is secured to and carried by said mirror.

17. In an apparatus of the character described, in combination, an orificed mirror, a reflector and an illuminant, and means whereby said reflector and illuminant are secured to and carried by said mirror.

18. In an apparatus of the character described, an orificed mirror, a reflector, and means whereby said reflector is adjustably secured to and carried by said mirror.

19. In an apparatus of the character described, in combination, an orificed mirror, a reflector and an illuminant, and means whereby said reflector and illuminant are adjustably secured to and carried by said mirror.

In testimony of which invention I have hereunto set my hand at Philadelphia on this 8th day of February, 1904.

ALFRED F. WATCH.

Witnesses:
M. M. HAMILTON,
WILLIAM B. MARKS.